(12) United States Patent
Peng et al.

(10) Patent No.: US 12,481,401 B2
(45) Date of Patent: Nov. 25, 2025

(54) TOUCH MONITORING CIRCUIT, TOUCH DISPLAY APPARATUS AND ELECTRONIC DEVICE

(71) Applicant: SHENZHEN HITEVISION TECHNOLOGY CO., LTD., Guangdong (CN)

(72) Inventors: Xin Peng, Guangdong (CN); Shuai Wang, Guangdong (CN); Shunxi Luo, Guangdong (CN); Zhiyong Wang, Guangdong (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/011,623

(22) Filed: Jan. 7, 2025

(65) Prior Publication Data

US 2025/0315130 A1   Oct. 9, 2025

(30) Foreign Application Priority Data

Apr. 3, 2024   (CN) .......................... 202420685214.6

(51) Int. Cl.
G06F 3/041   (2006.01)
G06F 3/043   (2006.01)

(52) U.S. Cl.
CPC .......... *G06F 3/04182* (2019.05); *G06F 3/043* (2013.01)

(58) Field of Classification Search
None
See application file for complete search history.

(56) References Cited

FOREIGN PATENT DOCUMENTS

CN   219590808 U   8/2023

*Primary Examiner* — Aneeta Yodichkas
(74) *Attorney, Agent, or Firm* — East IP P.C.

(57) ABSTRACT

The present application belongs to the technical field of touch detection, providing a touch monitoring circuit, touch display apparatus and electronic device. Sound inside the touch screen is detected by an inside-sound pick-up circuit to generate an inside-screen sound pick-up signal. Sound outside the touch screen is detected by an outside-sound pick-up signal to generate an outside-screen sound pick-up signal. The inside-sound pick-up circuit and the outside-sound pick-up circuit are connected to a signal operation circuit, and the signal operation circuit carries out an XNOR operation on the inside-screen sound pick-up signal and the outside-screen sound pick-up signal, thereby reserving a sound signal transmitted on the touch screen, eliminating a interfering signal inside and outside the touch screen to obtain the screen touch detection signal, and implementing a zero-touch-height detection of the touch screen.

20 Claims, 5 Drawing Sheets

TOUCH MONITORING CIRCUIT, TOUCH DISPLAY APPARATUS AND ELECTRONIC DEVICE

CROSS REFERENCE TO RELATED APPLICATION

The present application claims priority to Chinese Patent Application No. 202420685214.6 filed on Apr. 3, 2024, which is incorporated herein by reference in its entirety.

TECHNICAL FIELD

The present application belongs to the technical field of touch detection, in particular to a touch monitoring circuit, touch display apparatus and electronic device.

BACKGROUND

An infrared touchscreen includes a transmitting element disposed on an external frame and a receiving sensing element so as to form an infrared probing network on a screen surface, so that any touch object can change an infrared ray on a contact point to operate the infrared touch screen.

However, influenced by flatness of screen glass, glass protrusions may block a light path of the infrared ray, so a zero-height detection may not be implemented. Because a system may determine that a pen down action is performed when a touch pen has not contacted to the screen surface, a current infrared touch device have a large acquiring precision error.

SUMMARY

In a first aspect, embodiments of the present application provide a touch monitoring circuit, applied to a touch screen, the touch monitoring circuit comprising: an inside-sound pick-up circuit configured to detect sound inside the touch screen to generate an inside-screen sound pick-up signal; an outside-sound pick-up signal configured to detect sound outside the touch screen to generate an outside-screen sound pick-up signal; and a signal operation circuit, connected to the inside-sound pick-up circuit and the outside-sound pick-up circuit separately, and configured to carry out an XNOR operation on the inside-screen sound pick-up signal and the outside-screen sound pick-up signal to obtain a screen touch detection signal.

In some embodiments, the touch monitoring circuit further comprises: a whole-machine signal acquiring circuit configured to acquire an loudspeaker sound signal inside the touch screen, and transform the loudspeaker sound signal to a whole-machine reference signal; a zero-touch-height operation circuit, connected to the signal operation circuit and the whole-machine signal acquiring circuit, and configured to carry out a subtraction operation on the screen touch detection signal and the whole-machine reference signal to obtain a zero-touch-height monitoring signal.

In some embodiments, the zero-touch-height operation circuit comprises a subtractor, a first input terminal of the subtractor being connected to the signal operation circuit, a second input terminal of the subtractor being connected to the whole-machine signal operation circuit, an output end of the subtractor outputs the zero-touch-height monitoring signal.

In some embodiments, the touch monitoring circuit further comprises: a first signal filtering circuit, connected between the inside-sound pick-up circuit and the signal operation circuit, configured to filter, buffer, and then amplify the inside-screen sound pick-up signal; a second signal filtering circuit, connected between the outside-sound pick-up circuit and the signal operation circuit, configured to filter, buffer, and then amplify the outside-screen sound pick-up signal.

In some embodiments, the first signal filtering circuit comprises: a first filtering module, connected to the inside-sound pick-up circuit, and configured to filter the inside-screen sound pick-up signal; a first buffering module, connected to the first filtering module, and configured to buffer a signal output by the first filtering module; a first amplifying module, connected to the first buffering module and the signal operation circuit, and configured to amplify a signal output by the first buffering module to obtain an amplified signal, and output the amplified signal to the signal operation circuit.

In some embodiments, the inside-sound pick-up circuit comprises: a first sound sensor, disposed inside the touch screen, and configured to acquire sound inside the touch screen to obtain an inside-sound acquisition signal; a first signal transformation module, connected to the first sound sensor and the signal operation circuit, and configured to transform the inside-sound acquisition signal to the inside-screen sound pick-up signal.

In some embodiments, the outside-sound pick-up circuit comprises: a second sound sensor, disposed outside the touch screen, and configured to acquire sound outside the touch screen to obtain an outside-sound acquisition signal; a second signal transformation module, connected to the second sound sensor and the signal operation circuit, and configured to transform the inside-sound acquisition signal to the outside-screen sound pick-up signal.

In some embodiments, the signal operation circuit comprises: a first switch transistor, a second switch transistor, a third switch transistor, a fourth switch transistor, a fifth switch transistor, a sixth switch transistor, a seventh switch transistor, a first diode, a second diode, a third diode, a fourth diode, a tenth resistor, an eleventh resistor, a twelfth resistor, a thirteenth resistor, a seventh capacitor;

wherein a first end of the first switch transistor and a first end of the second switch transistor are connected together to a cathode of the first diode, a second end of the first switch transistor and a control end of the second switch transistor are commonly connected to an positive output end of the inside-sound pick-up circuit, and a control end of the first switch transistor and a second end of the second switch transistor are commonly connected to an positive output end of the outside-sound pick-up circuit;

wherein a first end of the third switch transistor and a first end of the fourth switch transistor are connected together to a cathode of the second diode, a second end of the third switch transistor and a control end of the fourth switch transistor are commonly connected to the positive output end of the inside-sound pick-up circuit, and a control end of the third switch transistor and a second end of the fourth switch transistor are commonly connected to the anode output end of the outside-sound pick-up circuit;

wherein a first end of the fifth switch transistor and a first end of the sixth switch transistor are commonly connected to a cathode of the third diode, a second end of the fifth switch transistor and a control end of the sixth switch transistor are commonly connected to the positive output end of the inside-sound pick-up circuit, and a control end of the fifth switch transistor and a second end of the sixth switch transistor are commonly connected to the positive output end of the outside-sound pick-up circuit; and wherein the anode of the first diode, the anode of the second diode, and the anode of the third diode are commonly connected to a first end of the tenth resistor, a second of the tenth resistor, a first end of the eleventh resistor, and a control end of the seventh switch transistor are commonly connected, a first end of the seventh switch transistor and a second end of the eleventh resistor are commonly connected to a second power supply end, a second end of the seventh switch transistor is connected to a first end of the twelfth resistor, a second end of the twelfth resistor and a first end of the thirteenth resistor are commonly connected to an anode of the fourth diode, a second end of the thirteenth resistor is grounded, a cathode of the fourth diode is connected to a first end of the seventh capacitor, and a second end of the seventh capacitor is a output end of the signal operation circuit.

In a second aspect, embodiments of the present application further provide a touch display apparatus comprising the touch monitoring circuit of any one of the above embodiments.

In a third aspect, embodiments of the present application further provide an electronic device, comprising the touch monitoring circuit of any one of the above embodiments; or comprising the touch display apparatus of any one of the above embodiments.

DETAILED DESCRIPTION

To make technical problems, technical solutions, and advantageous effects of the present application more clear and apparent, the present application is further described in detail in the following in accompany with drawings and embodiments. It should be understood that specific embodiments described herein are merely used to explain the present application and is not intended to limit the present application.

It should be noted that when an element is referred to as being "fixed to" or "disposed on" another element, it may be directly on another element or indirectly on another element. When an element is referred to as being "connected to" another element, it may be directly connected to another element or indirectly connected to another element.

It should be noted that an orientation or a positional relationship indicated by terms "length", "breadth", "up", "down", "front", "behind", "left", "right", "vertical", "horizontal", "top", "bottom", "inside", and "outside" is an orientation or a positional relationship shown in the accompanying drawings. The terms is merely for the convenience of describing the present application or simplifying description rather than indicating or implying that an apparatus or element must have a specific orientation or construct and operate in a specific orientation, and therefore it cannot be construed as limiting the present application.

Furthermore, terms "first" and "second" are merely intended to a descriptive purpose, and cannot be interpreted as indicating or implying relative importance or implicitly indicating the number of technical features indicated. Therefore, features limited by "first" or "second" can explicitly or implicitly include one or more of the features. In the description of the present application, "a plurality of" means one or more than one unless specifically stated otherwise.

Current infrared touch devices commonly estimate a distance from a touch stylus to a glass surface according to a variation in the light flux on an infrared lamp matrix. However, influenced by a flatness of a screen glass, glass bump may block a light path transferring an infrared ray, so that a zero-height detection cannot be operated, and the system may be determined to detect a stylus-down action when a stylus is not contacted with the screen surface. Therefore, the current infrared touch devices have a problem of having a large acquiring precision error.

Figure 1:
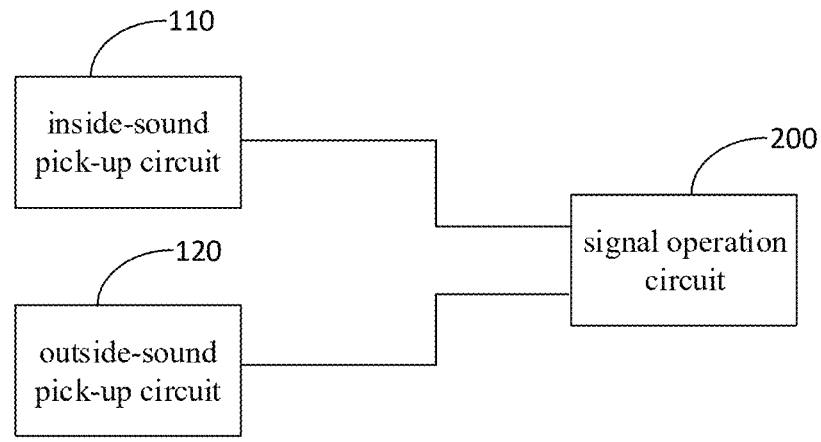
FIG. 1 is a first schematic view of a touch monitoring circuit provided in embodiments of the present application.

To solve the above technical problems, embodiments of the present application provide a touch monitoring circuit. In some embodiments, as shown in FIG. 1, the touch monitoring circuit is applied to a touch screen, wherein the touch monitoring circuit comprises an inside sound pick-up circuit 110, an outside-sound pick-up circuit 120, and a signal operation circuit 200. The inside-sound pick-up circuit 110 is configured to detect sound inside the touch screen to generate an inside-screen sound pick-up signal; the outside-sound pick-up circuit 120 is configured to detect sound outside the touch screen to generate an outside-screen sound pick-up signal; the signal operation circuit 200 is connected to the inside-sound pick-up circuit 110 and the outside-sound pick-up circuit 120 separately; and the signal operation circuit 200 is configured to carry out an XNOR operation on the inside-screen sound pick-up signal and the outside-screen sound pick-up signal to obtain a screen touch detection signal. A user or a main control module can determine whether there is a touch action on the touch screen is operated according to the high and low level of a screen touch detection signal. When the screen touch detection signal is at a high level, the touch screen is touched, and when the screen touch detection signal is at a low level, the touch screen is not touched.

In the embodiments, the inside-sound pick-up sound circuit 110 picks up sound signal inside the glass screen of the touch screen (e.g., noise of a whole-machine power supply or an inside whole-machine element; contact sound signal, such as stylus-down sound transferring from the glass screen) to obtain the inside-screen sound pick-up signal; the outside-sound pick-up circuit 120 picks up sound signal outside the glass screen of the touch screen (e.g., non-stationary noise, such as people speaking, clapping; and contact sound signal, such as stylus-down sound transferring from the glass screen) to obtain the outside-screen sound pick-up signal; and the signal operation circuit 200 carries out an XNOR operation on the inside-screen sound pick-up signal and the outside-screen sound pick-up signal. If the outside-screen sound pick-up signal is different from the inside-screen sound pick-up signal, the signal operation circuit 200 may output a screen touch detection signal at a low level, which indicates that there is no identical sound inside and outside the touch screen, no contact by an object with the screen, and no vibration on the screen. If the contact sound signal, such as stylus-down sound transferring from the glass screen, occurs inside and outside the screen and the outside-screen sound pick-up signal is identical to the inside-screen sound pick-up signal, it indicates that the touch screen may be touched. At this time, the signal operation circuit 200 carries out an XNOR operation on the two signals to output the screen touch detection signal at a high level, and the signal transferring on the glass screen can be reserved, thereby eliminating inside whole-machine interference and outside noise, so that a zero-touch-height writing detection of the touch screen is accomplished.

Figure 2:
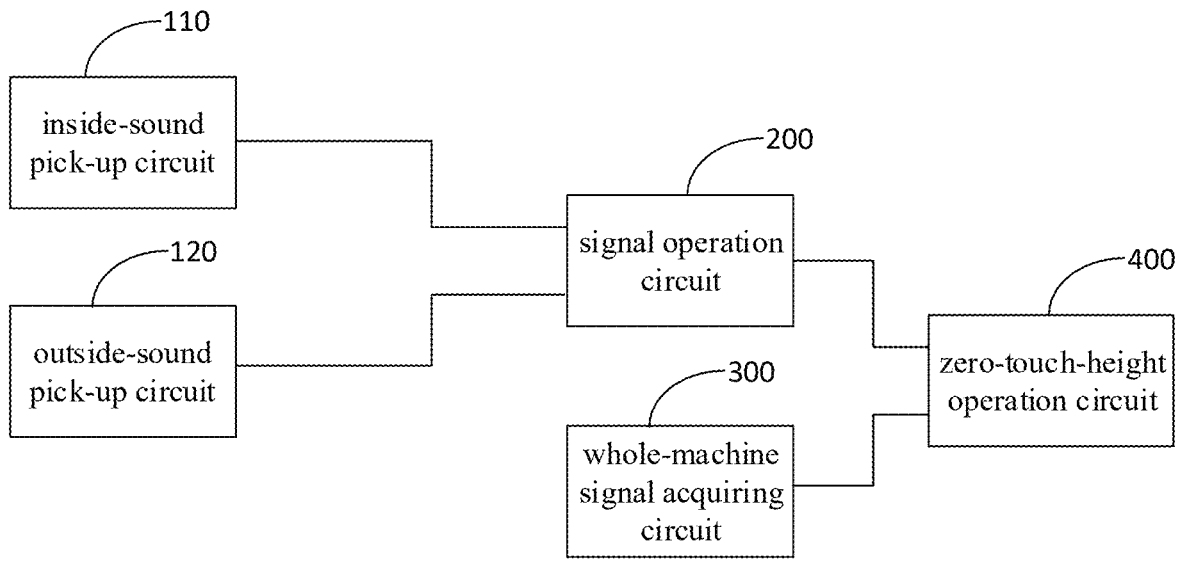
FIG. 2 is a second schematic view of a touch monitoring circuit provided in embodiments of the present application.

In some embodiments, as shown in FIG. 2, the touch monitoring circuit further comprises a whole-machine signal acquiring circuit 300 and a zero-touch-height operation circuit 400. The whole-machine signal acquiring circuit 300 is configured to acquire a loudspeaker sound signal inside the touch screen and transform the loudspeaker sound signal to a whole-machine reference signal. The zero-touch-height operation circuit is connected to the signal operation circuit 200 and the whole-machine signal acquiring circuit 300, and is configured to carry out a subtraction operation on the screen touch detection signal and the whole-machine reference signal to obtain a zero-touch-height monitoring signal.

In the embodiments, under a condition that a loudspeaker is disposed inside the touch screen, the whole machine of the touch screen may be vibrated when the loudspeaker plays audio. Therefore, the whole-machine signal acquiring circuit 300 is connected to an audio signal wire of the loudspeaker (i.e., a normal phase signal terminal and reverse phase signal terminal), samples signal from the normal phase signal terminal and the reverse phase signal terminal of the loudspeaker to obtain a loudspeaker sound signal, converts the loudspeaker sound signal of an analog form into a whole-machine reference signal of an digital form, and outputs the whole-machine reference signal of the digital form to the zero-touch-height operation circuit 400. The zero-touch-height operation circuit 400 performs a subtraction operation on the screen touch detection signal and the whole-machine reference signal to obtain a zero-touch-height monitoring signal. Such design can reduce interference of whole-machine vibration generated by the loudspeaker playing audio on touch operation recognition, thereby improving precision of touch monitoring.

Figure 3:
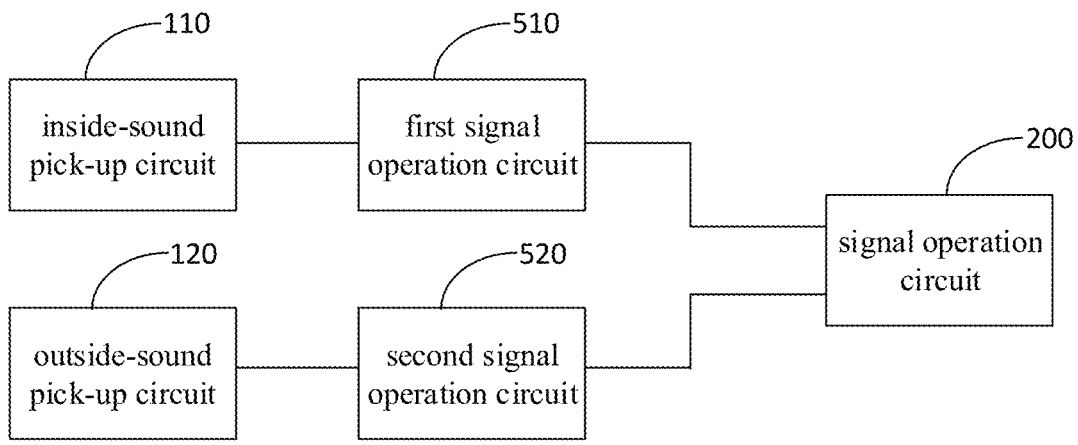
FIG. 3 is a third schematic view of a touch monitoring circuit provided in embodiments of the present application.

In some embodiments, as shown in FIG. 3, the touch monitoring circuit further comprises a first signal filtering circuit 510 and a second signal filtering circuit 520. The first signal filtering circuit 510 is connected between the inside-sound pick-up circuit 110 and the signal operation circuit 200; the inside-screen sound pick-up signal output by the inside-sound pick-up circuit 110 is filtered, buffered, and amplified by the first signal filtering circuit 510 and is output to the signal operation circuit 200. The second signal operation circuit 520 is connected between the outside-sound pick-up circuit 120 and the signal operation circuit 200; the outside-screen sound pick-up signal output by the outside-sound pick-up circuit 120 is filtered, buffered, and amplified by the second signal filtering circuit 520 and is output to the signal operation circuit 200.

In some embodiments, the touch monitoring circuit further comprises a main control module and can determine whether there is a touch action on the touch screen according to the high and low level of the screen touch detection signal. If the screen touch detection signal is at the high level, the touch screen may be touched; and if the screen touch detection signal is at the low level, the touch screen may not be touched.

In some embodiments, an sound pick-up direction of the inside-sound pick-up circuit 110 is inside the touch screen and the inside-sound pick-up circuit 110 continuously detects the sound signal inside the glass screen of the touch screen (e.g., noise of a whole-machine power supply or an inside whole-machine element; contact sound signal, such as stylus-down sound transferring from the glass screen) to obtain the inside-screen sound pick-up signal; the outside-sound pick-up circuit 120 continuously picks up the sound signal outside the glass screen of the touch screen (e.g., non-stationary noise, such as people speaking, clapping; and contact sound signal, such as stylus-down sound transferring from the glass screen) to obtain the outside-screen sound pick-up signal; and because the sound environment inside and outside the touch screen are different, under a condition that the touch screen is not touched, the sound pick-up signal obtained inside and outside the touch screen by sound detection are different; and under a condition that the touch screen is touched, because of the vibration of the glass screen of the touch screen, the contact sound signal, such as stylus-down sound, occurs inside and outside the glass screen. The signal operation circuit 200 carries out an XNOR operation on the inside-screen sound pick-up signal and the outside-screen sound pick-up signal; under a condition that the outside-screen sound pick-up signal is not identical to the inside-screen sound pick-up signal, there may be no contact by an object with the screen, and no vibration on the screen, and the signal operation circuit 200 outputs the screen touch detection signal at the low level; under a condition that the outside-screen sound pick-up signal is identical to the inside-screen sound pick-up signal, the glass screen of the touch screen is touched, the contact sound signal, such as stylus-down sound, occurs inside and outside the screen and the outside-screen sound pick-up signal simultaneously, and meanwhile, the signal operation circuit 200 carries out an XNOR operation on the two signals to output the screen touch detection signal at the high level.

In the embodiment, the inside-sound pick-up circuit 110 and the outside-sound pick-up circuit 120 continuously detect sound inside and outside the touch screen respectively. The main control module can continuously receive the corresponding screen touch detection signal. For example, under a condition that a monitoring period is t1, there is one monitoring frequency point every the monitoring period, the screen touch detection signal at each monitoring frequency point is in a state of the high level or low level, and for improving the monitoring precision, the main control module can determine that there is a touch action on the touch screen when the screen touch detection signal is at the high level at consecutive k monitoring frequency points.

In an embodiment, k can be equal to or larger than 10, and k is an integer.

In an embodiment, the main control module can determine whether there is a touch action on the touch screen according to a level state of the screen touch detection signal in a relative large determination period. Specifically, one determination period T1 may equal to m*t1, and m is a positive integer. In the determination period T1, although there is no situation in which the consecutive k monitoring frequency points are at the high level, the main control module still can determine that there is a touch action on the touch screen when the screen touch detection signal is at the high level at at least n monitoring frequency points of m monitoring frequency points in the determination period T1, wherein m is equal to or larger than n, n is equal to or larger than k, and n is a positive integer. As such design, the situation in which use environment of the touch screen is interfered by signal or sound can be avoided, and the precision of the touch monitoring can be extremely improved.

In some embodiments, m can be equal to or larger than 10, 0.5 m≤n, and m and n are integers.

In some embodiments, because the monitoring period t1 may be extremely small, such as t1=0.02 s, there may be 50 monitoring frequency points in 1 s. In actual application, the touch action is maintained for at least 0.1 s. Therefore, if there is a touch action on the touch screen, a situation in which the screen touch detection signal is at the high level at consecutive monitoring frequency points necessarily exists in one determination period T1. Under a condition that the screen touch detection signal is at the high level at the at least n monitoring frequency points of the m monitoring frequency points in the determination period T1, the main control module can determine whether there are the consecutive k monitoring frequency points, at which the screen touch detection signal is at the high level, in n monitoring frequency points at which the screen touch detection signal is at the high level. If in one determination period T1, the screen touch detection signal is at the high level at the n monitoring frequency points and the consecutive k monitoring frequency points, then it can be determined that a touch action occurs on the touch screen, and a situation in which an object falsely falls onto the touch screen can be avoided.

In some embodiments, after the touch action occurs on the touch screen, different objects touched with the glass screen of the touch screen generate different vibrations and different sounds. When the sound in which the touch action of the stylus touches the glass screen of the touch screen has a certain rule, the levels of the screen touch detection signal at the m monitoring frequency points have a certain rule in the determination period T1, the main control module may arrange the levels of the screen touch detection signal at the m monitoring frequency points in the determination period T1 according to a preset high and low level rule, and it can be determined that there is the touch action of the stylus occurs on the touch screen, so that the situation in which other objects falsely touch the touch screen can be avoided.

Figure 4:
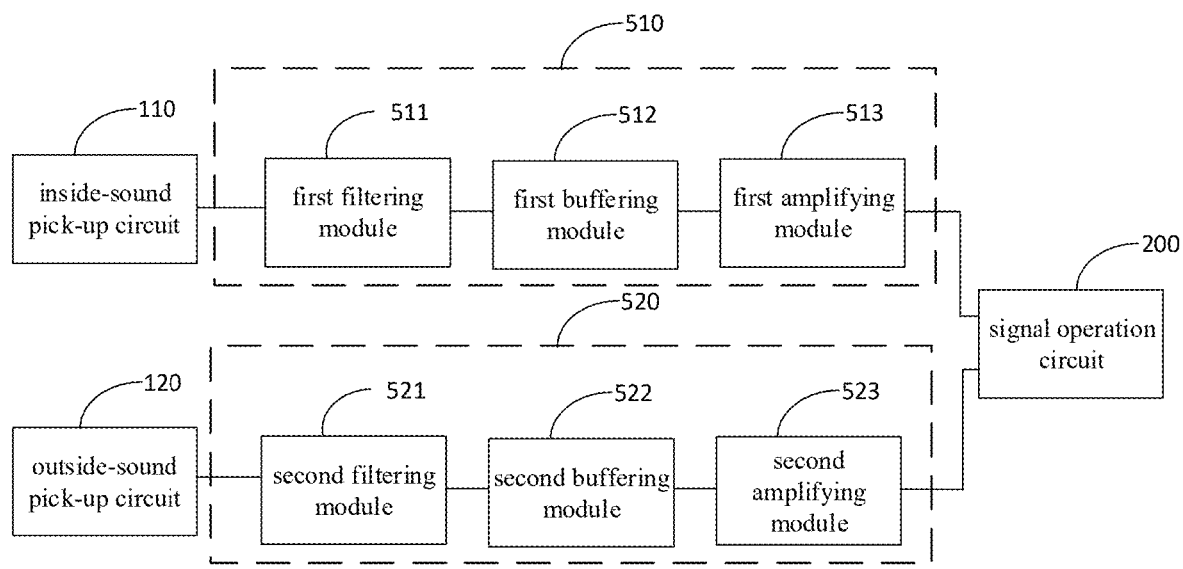
FIG. 4 is a fourth schematic view of a touch monitoring circuit provided in embodiments of the present application.

In some embodiments, as shown in FIG. 4, the first signal filtering circuit 510 comprises a first filtering module 511, a first buffering module 512, and a first amplifying module 513 that are connected in sequence. The first filtering module 511 is connected to the inside-sound pick-up circuit 110, and the inside-screen sound pick-up signal output by the inside-sound pick-up circuit 110 is filtered by the first filtering module 511. The first buffering module 512 is connected to the first filtering module 511, and the signal output by the first filtering module 511 is buffered by the first buffering module 512. The first amplifying module 513 is connected to the first buffering module 512 and the signal operation circuit 200, and the signal output by the first buffering module 512 is amplified by the first amplifying module 513, and then is output to the signal operation circuit 200. Such design can improve stability of the inside-screen sound pick-up signal, eliminate noise of the inside-screen sound pick-up signal, and reduce the error of touch screen detection.

In some embodiments, as shown in FIG. 4, the second signal filtering circuit 520 comprises a second filtering module 521, a second buffering module 522, and a second amplifying module 523 that are connected in sequence. The second filtering module 521 is connected to the outside-sound pick-up circuit 120, and the outside-screen sound pick-up signal output by the outside-sound pick-up circuit 120 is filtered by the second filtering module 521. The second buffering module 522 is connected to the second filtering module 521, and the signal output by the second filtering module 521 is buffered by the second buffering module 522. The second amplifying module 523 is connected to the second buffering module 522 and the signal operation circuit 200, and the signal output by the second buffering module 522 is amplified by the second amplifying module 523, and then is output to the signal operation circuit 200. Such design can improve stability of the outside-screen sound pick-up signal, eliminate noise of the outside-screen sound pick-up signal, and reduce the error of touch screen detection.

Figure 5:
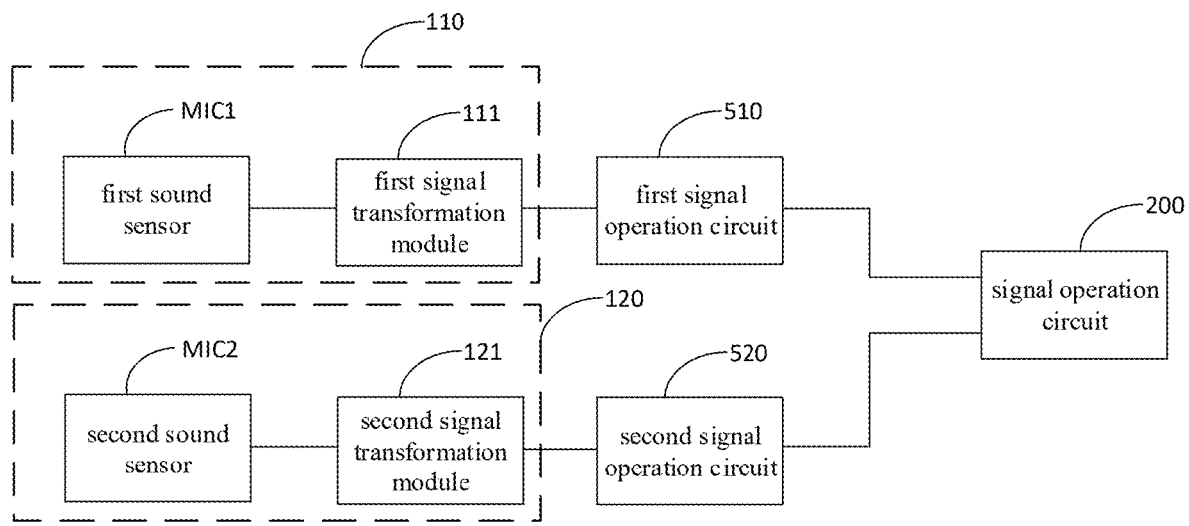
FIG. 5 is a fifth schematic view of a touch monitoring circuit provided in embodiments of the present application.

In some embodiments, as shown in FIG. 5, the inside-sound pick-up circuit 110 comprises a first sound sensor MIC1 and a first signal transformation module 111. The first sound sensor MIC1 is disposed inside the touch screen and used for acquiring sound inside the touch screen to obtain the inside-sound acquisition signal. The first signal transformation module 111 is connected to the first sound sensor MIC1 and the signal operation circuit 200, and the first signal transformation module 111 is used for transforming the inside-sound acquisition signal into the inside-screen sound pick-up signal.

In some embodiments, as shown in FIG. 5, the outside-sound pick-up circuit 120 comprises a second sound sensor MIC2 and a second signal transformation module 121. The second sound sensor MIC2 is disposed outside the touch screen and used for acquiring sound outside the touch screen to obtain the outside-sound acquisition signal. The second signal transformation module 121 is connected to the second sound sensor MIC2 and the signal operation circuit 200, and the second signal transformation module 121 is used for transforming the inside-sound acquisition signal into the outside-screen sound pick-up signal.

Figure 6:
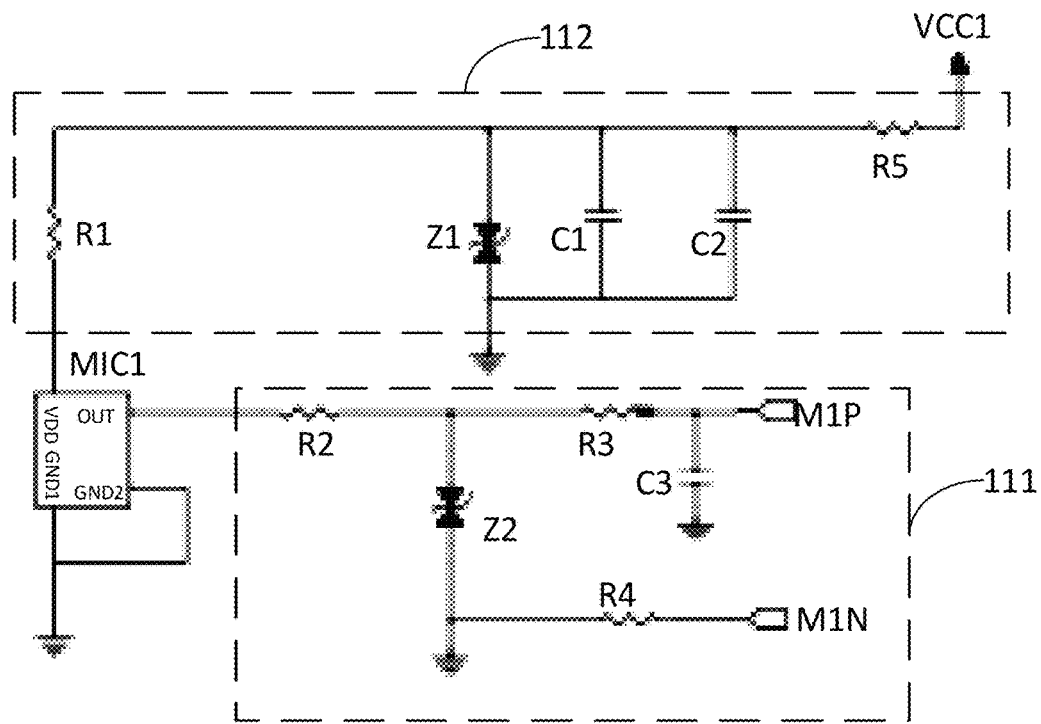
FIG. 6 is a schematic view of an inside-sound pick-up circuit provided in embodiments of the present application.

In some embodiments, as shown in FIG. 6, the first signal transformation module 111 comprises a second resistor R2, a third resistor R3, a fourth resistor R4, a third capacitor C3, and a second Zener diode Z2. An output pin OUT of the first sound sensor MIC1 is connected to a first end of the second resistor R2. A second end of the second resistor R2, a first end of the third resistor R3, and a first end of the second Zener diode Z2 are connected together. A second end of the third resistor R3 and a first end of the third capacitor C3 are connected together as a positive output end MIP of the inside-sound pick-up circuit 110. A second end of the third capacitor C3 is grounded, a second end of the second Zener diode Z2 and a first end of the fourth resistor R4 are connected together to the ground, and a second end of the fourth resistor R4 is taken as a negative output end M1N of the inside-sound pick-up circuit 110.

In the embodiments, the second resistor R2 can be taken as a current limiting resistor to perform current-limiting processing on the signal output by the output pin OUT of the first sound sensor MIC1. The signal output by the output pin OUT of the first sound sensor MIC1 is filtered by a filtering circuit consisting of the third resistor R3 and the third capacitor C3 to obtain the inside-screen sound pick-up signal, and is output by the positive output end MIP of the inside-sound pick-up circuit 110.

In some embodiments, as shown in FIG. 6, the inside-sound pick-up circuit 110 further comprises an inside voltage conversion module 112. The inside voltage conversion module 112 converts and regulate the voltage provided by a first power supply terminal VCC1 to output the voltage adapted to the first sound sensor MIC1, so that the first sound sensor MIC1 is powered.

In some embodiments, as shown in FIG. 6, the inside voltage conversion module 112 comprises a first resistor R1, a first capacitor C1, a second capacitor C2, a first Zener diode Z1, and a fifth resistor R5. A power pin VDD of the first sound sensor MIC1 is connected to a first end of the first resistor R1, and a first ground pin GND1 of the first sound sensor MIC1 and a second ground pin GND2 of the first sound sensor MIC1 are grounded. A second end of the first resistor R1, a first end of the first Zener diode Z1, a first end of the first capacitor C1, a first end of the second capacitor C2 and a first end of the fifth resistor R5 are commonly connected; a second end of the fifth resistor R5 is connected to the first power supply terminal VCC1, and a second end of the first Zener diode Z1, a second end of the first capacitor C1, and a second end of the second capacitor C2 are commonly connected to the ground.

Figure 7:
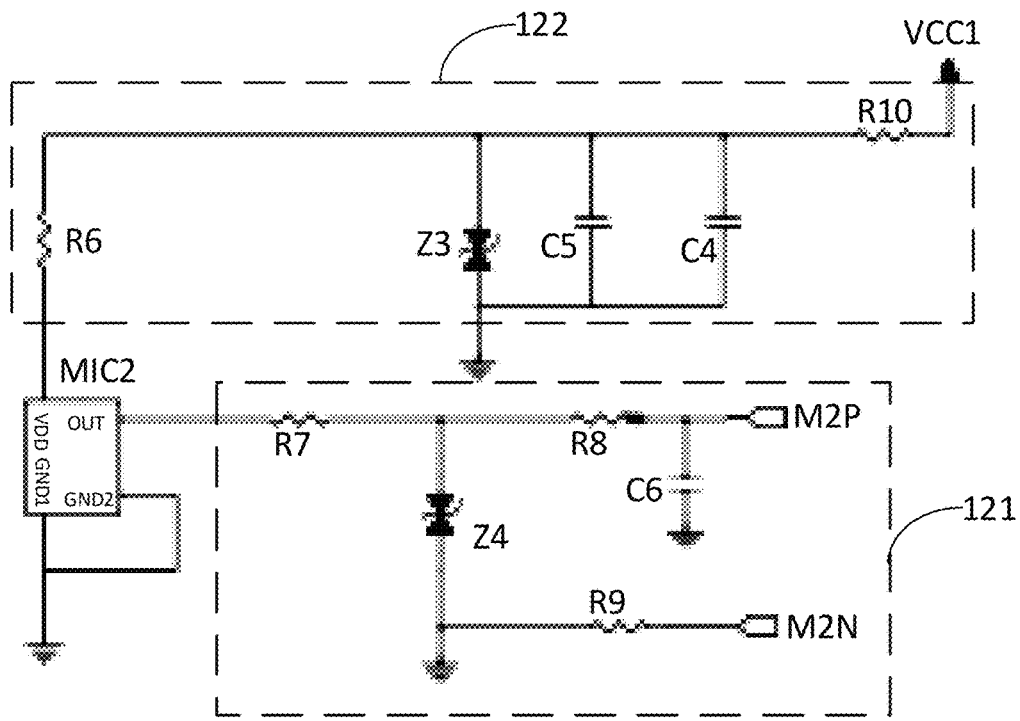
FIG. 7 is a schematic view of an outside-sound pick-up circuit provided in embodiments of the present application.

In some embodiments, as shown in FIG. 7, the second signal transformation module 121 comprises a seventh resistor R7, an eighth resistor R8, a ninth resistor R9, a sixth capacitor C6, and a fourth Zener diode Z4. An output pin OUT of the second sound sensor MIC2 is connected to a first end of the seventh resistor R7; a second end of the seventh resistor R7, a first end of the eighth resistor R8, and a first end of the fourth Zener diode Z4 are commonly connected; a second end of the eighth resistor R8 and a first end of the sixth capacitor C6 are commonly connected as a positive output end M2P of the outside-sound pick-up circuit 120; a second end of the sixth capacitor C6 is grounded; a second end of the fourth Zener diode Z4 and a first end of the ninth resistor R9 are commonly connected to the ground; and a second end of the ninth resistor R9 is taken as a negative output end M2N of the outside-sound pick-up circuit 120.

In the embodiments, the seventh resistor R7 can be taken as a current limiting resistor to perform current-limiting processing on the signal output by the output pin OUT of the second sound sensor MIC2. The signal output by the output pin OUT of the second sound sensor MIC2 is filtered by a filtering circuit consisting of the eighth resistor R8 and the sixth capacitor C6 to obtain the outside-screen sound pick-up signal, and is output by the positive output end M2P of the outside-sound pick-up circuit 120.

In some embodiments, as shown in FIG. 7, the outside-sound pick-up circuit 120 further comprises an outside voltage transformation module 122. The outside voltage transformation module 122 coverts and regulates the voltage provided by the first power supply terminal VCC1 to output the voltage adapting to the second sound sensor MIC2, so that the second sound sensor MIC2 is powered.

In some embodiments, as shown in FIG. 7, the outside voltage transformation module 122 comprises a sixth resistor R6, a tenth resistor R10, a fourth capacitor C4, a fifth capacitor C5, and a third Zener diode Z3. A power pin VDD of the second sound sensor MIC2 is connected to a first end of the sixth resistor R6. A second end of the sixth resistor R6, a first end of the third Zener diode Z3, a first end of the fifth capacitor C5, a first end of the fourth capacitor C4 and a first end of the tenth resistor R10 are commonly connected. A second end of the tenth resistor R10 is connected to the first power supply terminal VCC1. A second end of the third Zener diode Z3, a second end of the fifth capacitor C5 and a second end of the fourth capacitor C4 are grounded. A first ground pin GND1 of the second sound sensor MIC2 and a second ground pin GND2 of the second sound sensor MIC2 are grounded.

In some embodiments, the first sound sensor MIC1 and the second sound sensor MIC2 can be a microphone.

In some embodiments, the first ground pin GND1 and the second ground pin GND2 of the first sound sensor MIC1 have same potential, and the first ground pin GND1 and the second ground pin GND2 of the second sensor MIC2 have same potential.

In some embodiments, the first ground pin GND1 and the second ground pin GND2 of the first sound sensor MIC1 can be a same ground pin, and the first ground pin GND1 and the second ground pin GND2 of the second sensor MIC2 can be a same ground pin.

In some embodiments, the signal operation circuit 200 comprises an XNOR logical circuit. A first input terminal M1P_IN of the XNOR logical circuit is connected to the positive output end MIP of the outside-sound pick-up circuit 120, and a second input terminal M2P_IN of the XNOR logical circuit is connected to the positive output end M2P of the inside-sound pick-up circuit 110.

In the embodiments, the inside-sound pick-up circuit 110 picks up the sound signal inside the glass screen of the touch screen (e.g., noise of a whole-machine power supply or an inside whole-machine element; contact sound signal, such as stylus-down sound transferring from the glass screen) to obtain the inside-screen sound pick-up signal. The outside-sound pick-up circuit 120 picks up the sound signal outside the glass screen of the touch screen (e.g., non-stationary noise, such as people speaking, clapping; and contact sound signal, such as stylus-down sound transferring from the glass screen) to obtain the outside-screen sound pick-up signal. The XNOR logical circuit can be used for identity detection of the two signals, such as determining whether two numbers are identical. Therefore, the same sound signal inside and outside the glass screen of the touch screen can be recognized by performing an XNOR operation on the inside-screen sound pick-up signal and the outside-screen sound pick-up signal. In the actual application, only the contact sound signal, such as stylus-down sound transferring from the glass screen, can simultaneously occur inside and outside the glass screen of the touch screen. Specifically, the XNOR logical circuit in the present application have two input terminals and one output terminal. When only one of the two input terminals is at a low level (logical 0), the output of the XNOR logical circuit is the low level; when the input level of the two input terminals are the same, the output of the XNOR logical circuit is the high level (logical 1); therefore, when the screen touch detection signal is at a high level, a stylus is contacted with the glass screen of the touch screen.

Figure 8:
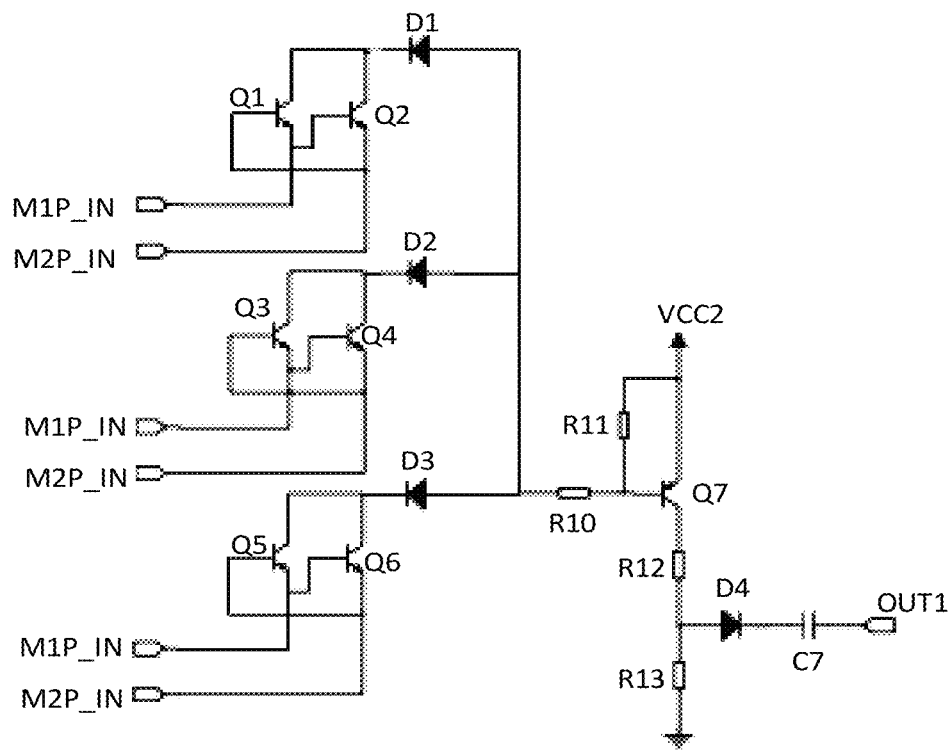
FIG. 8 is a schematic view of an signal operation circuit provided in embodiments of the present application.

In some embodiments, as shown in FIG. 8, the signal operation circuit 200 comprises a first switch transistor Q1, a second switch transistor Q2, a third switch transistor Q3, a fourth switch transistor Q4, a fifth switch transistor Q5, a sixth switch transistor Q6, a first diode D1, a second diode D2, a third diode D3, a fourth diode D4, a tenth resistor R10, an eleventh resistor R11, a twelfth resistor R12, a thirteenth resistor R13, and a seventh capacitor C7. A first end of the first switch transistor Q1 and a first end of the second switch transistor Q2 are connected together to a cathode of the first diode D1. A second end of the first switch transistor Q1 and a control end of the second switch transistor Q2 are commonly connected as a first input terminal M1P_IN of the signal operation circuit 200. A first input terminal M1P_IN of the signal operation circuit 200 can be directly connected to a positive output end M1P of the inside-sound pick-up circuit 110. A control end of the first switch transistor Q1 and a second end of the second switch transistor Q2 are commonly connected as a second input terminal M2P_IN of the signal operation circuit 200. The second input terminal M2P_IN of the signal operation circuit 200 can be directly connected to the positive output terminal M2P of the outside-sound pick-up circuit 120.

A first end of the third switch transistor Q3 and a first end of the fourth switch transistor Q4 are commonly connected to a cathode of the second diode D2. A second end of the third switch transistor Q3 and a control end of the fourth switch transistor Q4 are commonly connected to the first input terminal M1P_IN of the signal operation circuit 200. A control end of the third switch transistor Q3 and a second end of the fourth switch transistor Q4 are connected together to the second input terminal M2P_IN of the signal operation circuit 200.

A first end of the fifth switch transistor Q5 and a first end of the sixth switch transistor Q6 are commonly connected to a cathode of the third diode D3. A second end of the fifth switch transistor Q5 and a control end of the sixth switch transistor Q6 are commonly connected to the first input terminal M1P_IN of the signal operation circuit 200. A control end of the fifth switch transistor Q5 and a second end of the sixth switch transistor Q6 are commonly connected to the second input terminal M2P_IN of the signal operation circuit 200.

In the embodiments, the first switch transistor Q1, the second switch transistor Q2, the third switch transistor Q3, the fourth switch transistor Q4, the fifth switch transistor Q5, and the sixth switch transistor Q6 can be combined into three XOR gates. The three XOR gates perform a superimposed operation, so that when only one of the first input terminal M1P_IN and the second input terminal M2P_IN of the signal operation circuit 200 is at the low level (logical 0), an anode of the first diode D1, the second diode D2, and the third diode D3 are set to the high level, and only when the first input terminal M1P_IN and the second input terminal M2P_IN of the signal operation circuit 200 are at the same level, the anode of the first diode D1, the second diode D2, and the third diode D3 are set to the low level.

The anode of the first diode D1, the second diode D2, and the third diode D3 are commonly connected to the first end of the tenth resistor R10; the second end of the tenth resistor R10, a first end of the eleventh resistor R11, and a control end of the seventh switch transistor Q7 are commonly connected; a first end of the seventh switch transistor Q7 and a second end of the eleventh resistor R11 are commonly connected to a second power supply terminal; a second end of the seventh switch transistor Q7 is connected to a first end of the twelfth resistor R12; a second end of the twelfth resistor R12 and a first end of the thirteenth resistor R13 are commonly connected to an anode of the fourth diode D4; a second end of the thirteenth resistor R13 is grounded; a cathode of the fourth diode D4 is connected to a first end of the seventh capacitor C7; and a second end of the seventh capacitor C7 is taken as an output end of the signal operation circuit 200.

In the embodiments, the tenth resistor R10, the eleventh resistor R11, the seventh switch transistor Q7, the twelfth resistor R12, and the thirteenth resistor R13 can be combined into a NOT gate. The anode of the first diode D1, the anode of the second diode D2, and the anode of the third diode D3 are commonly connected to an input terminal of the NOT gate. When only one of the first input terminal M1P_IN and the second input terminal M2P_IN of the signal operation circuit 200 is at the low level (logical 0), the control end of the seventh switch transistor Q7 is at the high level, while the output end of the signal operation circuit 200 is at the low level. When the first input terminal M1P_IN and the second input terminal M2P_IN of the signal operation circuit 200 are at the same level, the control end of the seventh switch transistor Q7 is at the low level, and the output end of the signal operation circuit 200 is at the high level.

In some embodiments, all of the first switch transistor Q1, the second switch transistor Q2, the third switch transistor Q3, the fourth switch transistor Q4, the fifth switch transistor Q5, and the sixth switch transistor Q6 are NPN triodes or N-type MOS transistors.

In some embodiments, the seventh switch transistor Q7 can be a PNP triode or a P-type MOS transistor.

In some embodiments, the zero-touch-height operation circuit 400 comprises a subtractor. A first input terminal of the subtractor is connected to the signal operation circuit 200, a second input terminal of the subtractor is connected to the whole-machine signal acquiring circuit 300, and an output end of the subtractor outputs the zero-touch-height monitoring signal.

Figure 9:
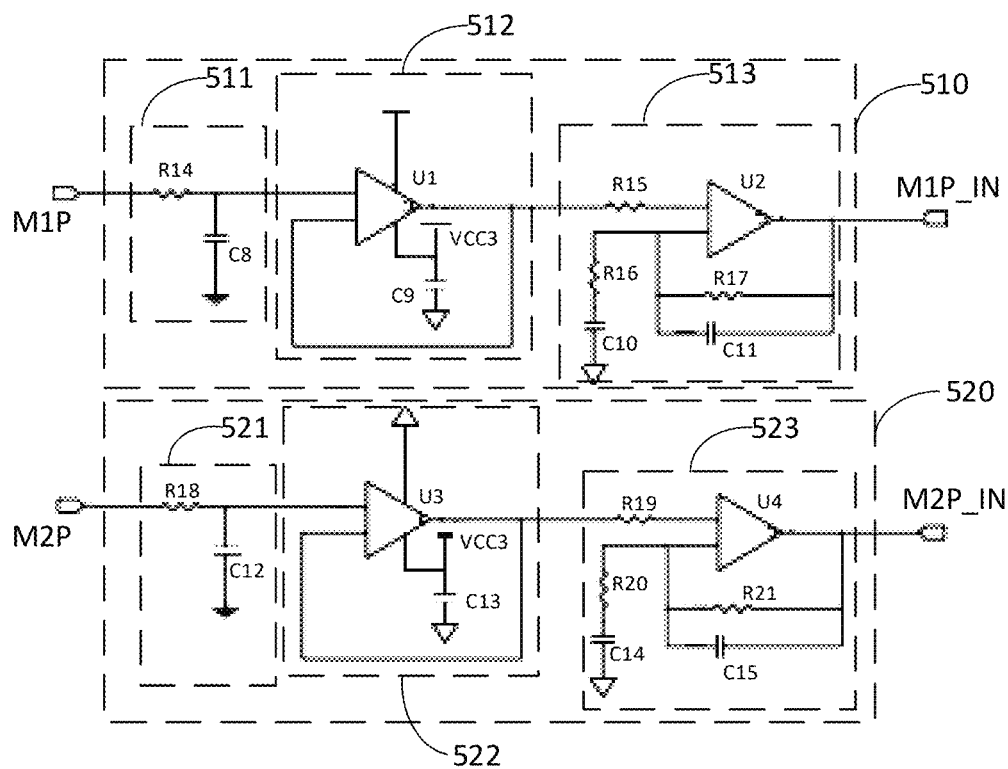
FIG. 9 is a schematic view of a first signal filtering circuit and a second signal filtering circuit provided in embodiments of the present application.

In some embodiments, as shown in FIG. 9, the first filtering module 511 comprises a fourteenth R14 and the eighth capacitor C8. A first end of the fourteenth resistor R14 is connected to the positive output end M1P of the inside-sound pick-up circuit 110. A second end of the fourteenth resistor R14 and a first end of the eighth capacitor C8 are commonly connected to a normal-phase input pin of a first operation amplifier U1. A second end of the eighth capacitor C8 is grounded. The fourteenth resistor R14 and the eighth capacitor C8 forms a front filtering circuit. The inside-screen sound pick-up signal output by the positive output end M1P of the inside-sound pick-up circuit 110 is filtered by the front filtering circuit, and is output to the first buffering module 512.

In some embodiments, as shown in FIG. 9, the first buffering module 512 comprises the first operation amplifier U1 and the ninth capacitor C9. A ground pin of the first operation amplifier U1 is grounded. A power pin of the first operation amplifier U1 and a first end of the ninth capacitor C9 are commonly connected to a third power supply terminal VCC3. The second end of the ninth capacitor C9 is grounded. The inside-screen sound pick-up signal output by the positive output end MIP of the inside-sound pick-up circuit 110 is filtered by the front filtering circuit, buffered by a follower circuit consisting of the first operation amplifier U1, and then output to the first amplifying module 513.

In some embodiments, as shown in FIG. 9, the first amplifying module 513 comprises a fifteenth resistor R15, a sixteenth resistor R16, a seventeenth resistor R17, a tenth capacitor C10, an eleventh capacitor C11, and a second operation amplifier U2. A reverse-phase input pin of the first operation amplifier U1 and an output pin of the first operation amplifier U1 are commonly connected to a first end of the fifteenth resistor R15; a second end of the fifteenth resistor R15 is connected to a normal-phase input pin of the second operation amplifier U2; a reverse-phase input pin of the second operation amplifier U2, a first end of the sixteenth resistor R16, a first end of the seventeenth resistor R17, and a first end of the eleventh capacitor C11 are commonly connected; a second end of the sixteenth resistor R16 is connected to a first end of the tenth capacitor C10; a second end of the tenth capacitor C10 is grounded; and a second end of the seventeenth resistor R17, a second end of the eleventh resistor R17, a second end of the eleventh capacitor C11, and an output pin of the second operation amplifier U2 are commonly connected the first input terminal M1P_IN of the signal operation circuit 200.

In an embodiment, the signal output by the first buffering module 512 is output to the normal-phase input pin of the second operation amplifier U2 thought the fifteenth resistor R15, is amplified by a operation amplifying circuit consisting of the second operation amplifier U2, the sixteenth resistor R16, the seventeenth resistor R17, and the eleventh capacitor C11, and is output to the first input terminal M1P_IN of the signal operation circuit 200, thereby avoiding operation errors resulted from that signal entering the signal operation circuit 200 and having small amplitude is covered by signal noise.

In some embodiments, as shown in FIG. 9, the second filtering module 521 comprises an eighteenth resistor R18 and a twelfth capacitor C12. A first end of the eighteenth resistor R18 is connected to the positive output end M2P of the outside-sound pick-up circuit 120; a second end of the eighteenth resistor R18 and a first end of the twelfth capacitor C12 are commonly connected to a normal-phase input pin of a third operation amplifier U3; a second end of the twelfth capacitor C12 is grounded; the eighteenth resistor R18 and the twelfth capacitor C12 forms a front filtering circuit; and the outside-screen sound pick-up signal output by the positive output end M2P of the outside-sound pick-up circuit 120 is filtered by the front filtering circuit.

In some embodiments, as shown in FIG. 9, the second buffering module 522 comprises a thirteenth capacitor C13 and the third operation amplifier U3. A power pin of the third operation amplifier U3 and a first end of the thirteenth capacitor C13 are commonly connected to the third power supply terminal; a second end of the thirteenth capacitor C13 is grounded; and the outside-screen sound pick-up signal output by the positive output end M2P of the outside-sound pick-up circuit 120 is filtered by the front filtering circuit, and then is buffered by a follower circuit consisting of the third operation amplifier U3.

In some embodiments, as shown in FIG. 9, the second amplifying module 523 comprises a nineteenth resistor R19, a twentieth resistor R20, a twenty-first resistor R21, a fourteenth capacitor C14, a fifteenth capacitor C15, and a fourth operation amplifier U4. A ground pin of the third operation amplifier U3 is grounded; an output pin and a reverse-phase input pin of the third operation amplifier U3 are commonly connected to a first end of the nineteenth resistor R19; a second end of the nineteenth resistor R19 is connected to a normal-phase input pin of the fourth operation amplifier U4; a reverse-phase input pin of the fourth operation amplifier U4, a first end of the twentieth resistor R20, a first end of the twenty-first resistor R21, and a first end of the fifteenth capacitor C15 are commonly connected; a second end of the twentieth resistor R20 is connected to a first end of the fourteenth capacitor C14, and a second end of the fourteenth capacitor C14 is grounded; a second end of the twenty-first resistor R21, a second end of the fifteenth capacitor C15, and an output pin of the fourth operation amplifier U4 are commonly connected to the second input terminal M2P_IN of the signal operation circuit 200. In the embodiments, the signal output by the second buffering module 522 is output to the normal-phase input pin of the fourth operation amplifier U4 through the nineteenth resistor R19 again, amplified by an operation amplifying circuit consisting of the fourth operation amplifier U4, the twentieth resistor R20, the twenty-first resistor R21, and the fifteenth capacitor C15, and then output to the second input terminal M2P_IN of the signal operation circuit 200.

In some embodiments, the whole-machine signal acquiring circuit 300 comprises a loudspeaker output acquiring module and an analog-to-digital conversion module. The loudspeaker output acquiring module is connected to the loudspeaker inside the touch screen, and is used for sampling the normal-phase signal and reverse-phase signal of the loudspeaker to obtain the loudspeaker sound signal; and the analog-to-digital conversion module is connected to the loudspeaker output acquiring module, and is used for transforming the loudspeaker sound signal into the whole-machine reference signal.

In the embodiments, under the condition that a loudspeaker is disposed inside the touch screen, the whole machine of the touch screen may be vibrated when the loudspeaker plays audio. Therefore, the loudspeaker output acquiring module is connected to an audio signal wire of the loudspeaker (i.e., a normal-phase signal terminal and reverse-phase signal terminal), samples signal from the normal-phase signal terminal and the reverse-phase signal terminal of the loudspeaker to obtain a loudspeaker sound signal, and converts the loudspeaker sound signal of an analog form into a whole-machine reference signal of an digital form. The zero-touch-height operation circuit 400 performs a subtraction operation on the screen touch detection signal and the whole-machine reference signal to obtain a zero-touch-height monitoring signal. Such design can reduce interference of whole-machine vibration generated by the loudspeaker playing audio on touch operation recognition, thereby improving precision of touch monitoring.

Figure 10:
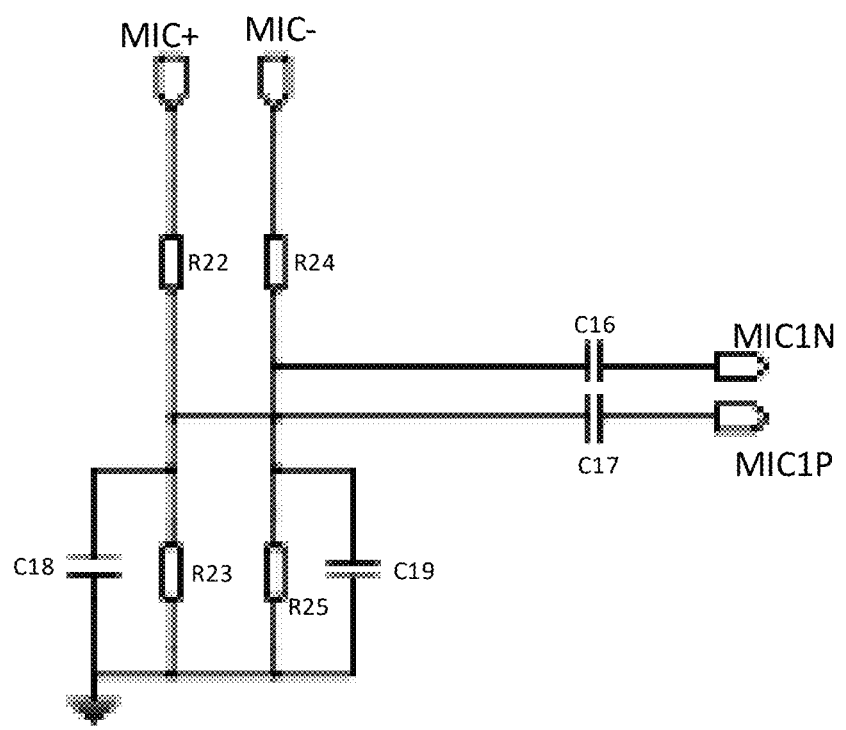
FIG. 10 is a schematic view of a loudspeaker output acquiring module provided in embodiments of the present application.

In some embodiments, as shown in FIG. 10, the loudspeaker output acquiring module comprises a twenty-second resistor R22, a twenty-third resistor R23, a twenty-fourth resistor R24, a twenty-fifth resistor R25, a sixteenth capacitor C16, a seventeenth capacitor C17, an eighteenth capacitor C18, and a nineteenth capacitor C19. A first end of the twenty-second resistor R22 is connected to the normal-phase signal terminal MIC+ of the loudspeaker; a first end of the twenty-fourth resistor R24 is connected to the reverse-phase signal terminal MIC− of the loudspeaker; a second end of the twenty-second resistor R22, a first end of the eighteenth capacitor C18, and a first end of the twenty-third resistor R23 are commonly connected a first end of the seventeenth capacitor C17; a second end of the twenty-fourth resistor R24, a first end of the twenty-fifth resistor R25, and a first end of the nineteenth capacitor C19 are commonly connected to a first end of the sixteenth capacitor C16; a second end of the eighteenth capacitor C18, a second end of the twenty-third resistor R23, a second end of the twenty-fifth resistor R25, and a second end of the nineteenth capacitor C19 are commonly connected to the ground; a second end of the sixteenth capacitor C16 is connected to the analog-to-digital conversion module; and a second end of the seventeenth capacitor C17 is connected to the analog-to-digital conversion module.

Embodiments of the present application further provide a touch display apparatus comprising the touch monitoring circuit in any one of the above embodiments.

In some embodiments, the touch display apparatus further comprises a touch screen and an apparatus housing, and the touch monitoring circuit is disposed inside a cavity formed by the touch screen and the apparatus housing.

Embodiments of the present application provide an electronic device, and the electronic device comprises the touch display apparatus in any one of the above embodiments.

Advantageous Effects of Embodiments of the Present Application:

Sound inside the touch screen is detected by the inside-sound pick-up circuit to generate the inside-screen sound pick-up signal. Sound outside the touch screen is detected by the outside-sound pick-up signal to generate the outside-screen sound pick-up signal. The inside-sound pick-up circuit and the outside-sound pick-up circuit are connected to the signal operation circuit, and the signal operation circuit carries out an XNOR operation on the inside-screen sound pick-up signal and the outside-screen sound pick-up signal, thereby reserving a sound signal transmitted on the touch screen, eliminating a interfering signal inside and outside the touch screen to obtain the screen touch detection signal, and implementing a zero-touch-height detection of the touch screen.

It will be clear to those skilled in the art that the above function units and modules are only exemplarily illustrated for convenience and briefness of the description. In the actual application, the above functions can be assigned to and be accomplished by different function units and modules as needed. That is, the internal structure of the apparatus is divided into different function units or modules to accomplish all or part of the functions described above. In an embodiment, all function units and modules may be integrated into a processing unit, or each unit may have a physical presence separately, or two or more than two of the units may be integrated into one unit.

Furthermore, the specific names of the functional units and modules are also merely for convenience of distinguishing each other, and are not intended to limit the scope of the present application. For specific working processes of units and modules in the foregoing system, the corresponding processes in the foregoing method embodiments can be referred, and therefore the details will not be repeated here.

In above embodiments, the description of each embodiment has a side weight, and parts not detailed or described in a certain embodiment may refer to related descriptions of other embodiments.

Furthermore, in embodiments of the present application, all function units and modules may be integrated into a processing unit, or each unit may have a physical presence separately, or two or more than two of the units may be integrated into one unit.

The foregoing embodiments is merely for describing the technical solution of the present application and not limitations. Even though the present application is specifically described referring to the above embodiments, it should be understood by those skilled in the art that the technical solutions described in above embodiments still can be modified, or some technical features therein can be equivalently substituted; and these modifications or substitutions do not depart the essence of the corresponding technical solutions from the spirit and scope of embodiments, and should be included within the scope of the present application.

What is claimed is:

1. A touch monitoring circuit, applied to a touch screen, the touch monitoring circuit comprising:
    an inside-sound pick-up circuit configured to detect sound inside the touch screen to generate an inside-screen sound pick-up signal;
    an outside-sound pick-up circuit configured to detect sound outside the touch screen to generate an outside-screen sound pick-up signal; and
    a signal operation circuit, connected to the inside-sound pick-up circuit and the outside-sound pick-up circuit separately, and configured to carry out an XNOR operation on the inside-screen sound pick-up signal and the outside-screen sound pick-up signal to obtain a screen touch detection signal.

2. The touch monitoring circuit according to claim 1, wherein the touch monitoring circuit further comprises:
    a whole-machine signal acquiring circuit configured to acquire a loudspeaker sound signal inside the touch screen, and transform the loudspeaker sound signal to a whole-machine reference signal;
    a zero-touch-height operation circuit, connected to the signal operation circuit and the whole-machine signal acquiring circuit, and configured to carry out a subtraction operation on the screen touch detection signal and the whole-machine reference signal to obtain a zero-touch-height monitoring signal.

3. The touch monitoring circuit according to claim 2, wherein the zero-touch-height operation circuit comprises a subtractor, a first input terminal of the subtractor being connected to the signal operation circuit, a second input terminal of the subtractor being connected to the whole-machine signal operation circuit, and an output end of the subtractor outputting the zero-touch-height monitoring signal.

4. The touch monitoring circuit according to claim 1, wherein the touch monitoring circuit further comprises a main control module configured to determine whether there is a touch action on the touch screen according to a level state of the screen touch detection signal.

5. The touch monitoring circuit according to claim 1, wherein the touch monitoring circuit further comprises:
    a first signal filtering circuit, connected between the inside-sound pick-up circuit and the signal operation circuit, and configured to filter, buffer, and then amplify the inside-screen sound pick-up signal;
    a second signal filtering circuit, connected between the outside-sound pick-up circuit and the signal operation circuit, and configured to filter, buffer, and then amplify the outside-screen sound pick-up signal.

6. The touch monitoring circuit according to claim 5, wherein the first signal filtering circuit comprises:
    a first filtering module, connected to the inside-sound pick-up circuit, and configured to filter the inside-screen sound pick-up signal;
    a first buffering module, connected to the first filtering module, and configured to buffer a signal output by the first filtering module;
    a first amplifying module, connected to the first buffering module and the signal operation circuit, and configured to amplify a signal output from the first buffering module to obtain an amplified signal, and output the amplified signal to the signal operation circuit.

7. The touch monitoring circuit according to claim 1, wherein the inside-sound pick-up circuit comprises:
    a first sound sensor, disposed inside the touch screen, and configured to acquire sound inside the touch screen to obtain an inside-sound acquisition signal;
    a first signal transformation module, connected to the first sound sensor and the signal operation circuit, and configured to transform the inside-sound acquisition signal to the inside-screen sound pick-up signal.

8. The touch monitoring circuit according to claim 1, wherein the outside-sound pick-up circuit comprises:
  a second sound sensor, disposed outside the touch screen, and configured to acquire sound outside the touch screen to obtain an outside-sound acquisition signal;
  a second signal transformation module, connected to the second sound sensor and the signal operation circuit, and configured to transform the inside-sound acquisition signal to the outside-screen sound pick-up signal.

9. The touch monitoring circuit according to claim 1, wherein the signal operation circuit comprises: a first switch transistor, a second switch transistor, a third switch transistor, a fourth switch transistor, a fifth switch transistor, a sixth switch transistor, a seventh switch transistor, a first diode, a second diode, a third diode, a fourth diode, a tenth resistor, an eleventh resistor, a twelfth resistor, a thirteenth resistor, and a seventh capacitor;
  wherein a first end of the first switch transistor and a first end of the second switch transistor are connected together to a cathode of the first diode, a second end of the first switch transistor and a control end of the second switch transistor are commonly connected to a positive output end of the inside-sound pick-up circuit, and a control end of the first switch transistor and a second end of the second switch transistor are commonly connected to a positive output end of the outside-sound pick-up circuit;
  wherein a first end of the third switch transistor and a first end of the fourth switch transistor are commonly connected to a cathode of the second diode, a second end of the third switch transistor and a control end of the fourth switch transistor are commonly connected to the positive output end of the inside-sound pick-up circuit, and a control end of the third switch transistor and a second end of the fourth switch transistor are commonly connected to the positive output end of the outside-sound pick-up circuit;
  wherein a first end of the fifth switch transistor and a first end of the sixth switch transistor are commonly connected to a cathode of the third diode, a second end of the fifth switch transistor and a control end of the sixth switch transistor are commonly connected to the positive output end of the inside-sound pick-up circuit, and a control end of the fifth switch transistor and a second end of the sixth switch transistor are commonly connected to the positive output end of the outside-sound pick-up circuit; and
  wherein the anode of the first diode, the anode of the second diode, and the anode of the third diode are commonly connected to a first end of the tenth resistor, a second of the tenth resistor, a first end of the eleventh resistor, and a control end of the seventh switch transistor are commonly connected, a first end of the seventh switch transistor and a second end of the eleventh resistor are commonly connected to a second power supply end, a second end of the seventh switch transistor is connected to a first end of the twelfth resistor, a second end of the twelfth resistor and a first end of the thirteenth resistor are commonly connected to an anode of the fourth diode, a second end of the thirteenth resistor is grounded, a cathode of the fourth diode is connected to a first end of the seventh capacitor, and a second end of the seventh capacitor is a output end of the signal operation circuit.

10. A touch display apparatus, comprising a touch monitoring circuit, wherein the touch monitoring circuit comprises an inside-sound pick-up circuit configured to detect sound inside the touch screen to generate an inside-screen sound pick-up signal;
  an outside-sound pick-up circuit configured to detect sound outside the touch screen to generate an outside-screen sound pick-up signal; and
  a signal operation circuit, connected to the inside-sound pick-up circuit and the outside-sound pick-up circuit separately, and configured to carry out an XNOR operation on the inside-screen sound pick-up signal and the outside-screen sound pick-up signal to obtain a screen touch detection signal.

11. The touch display apparatus according to claim 10, wherein the touch monitoring circuit further comprises:
  a whole-machine signal acquiring circuit configured to acquire a loudspeaker sound signal inside the touch screen, and transform the loudspeaker sound signal to a whole-machine reference signal;
  a zero-touch-height operation circuit, connected to the signal operation circuit and the whole-machine signal acquiring circuit, and configured to carry out a subtraction operation on the screen touch detection signal and the whole-machine reference signal to obtain a zero-touch-height monitoring signal.

12. The touch display apparatus according to claim 11, wherein the zero-touch-height operation circuit comprises a subtractor, a first input terminal of the subtractor being connected to the signal operation circuit, a second input terminal of the subtractor being connected to the whole-machine signal operation circuit, and an output end of the subtractor outputting the zero-touch-height monitoring signal.

13. The touch display apparatus according to claim 10, wherein the touch monitoring circuit further comprises a main control module configured to determine whether there is a touch action on the touch screen according to a level state of the screen touch detection signal.

14. The touch display apparatus according to claim 10, wherein the touch monitoring circuit further comprises:
  a first signal filtering circuit, connected between the inside-sound pick-up circuit and the signal operation circuit, and configured to filter, buffer, and then amplify the inside-screen sound pick-up signal;
  a second signal filtering circuit, connected between the outside-sound pick-up circuit and the signal operation circuit, and configured to filter, buffer, and then amplify the outside-screen sound pick-up signal.

15. The touch display apparatus according to claim 14, wherein the first signal filtering circuit comprises:
  a first filtering module, connected to the inside-sound pick-up circuit, and configured to filter the inside-screen sound pick-up signal;
  a first buffering module, connected to the first filtering module, and configured to buffer a signal output by the first filtering module;
  a first amplifying module, connected to the first buffering module and the signal operation circuit, and configured to amplify a signal output from the first buffering module to obtain an amplified signal, and output the amplified signal to the signal operation circuit.

16. The touch display apparatus according to claim 10, wherein the inside-sound pick-up circuit comprises:
  a first sound sensor, disposed inside the touch screen, and configured to acquire sound inside the touch screen to obtain an inside-sound acquisition signal;
  a first signal transformation module, connected to the first sound sensor and the signal operation circuit, and configured to transform the inside-sound acquisition signal to the inside-screen sound pick-up signal.

17. The touch display apparatus according to claim 10, wherein the outside-sound pick-up circuit comprises:
- a second sound sensor, disposed outside the touch screen, and configured to acquire sound outside the touch screen to obtain an outside-sound acquisition signal;
- a second signal transformation module, connected to the second sound sensor and the signal operation circuit, and configured to transform the inside-sound acquisition signal to the outside-screen sound pick-up signal.

18. The touch display apparatus according to claim 10, wherein the signal operation circuit comprises: a first switch transistor, a second switch transistor, a third switch transistor, a fourth switch transistor, a fifth switch transistor, a sixth switch transistor, a seventh switch transistor, a first diode, a second diode, a third diode, a fourth diode, a tenth resistor, an eleventh resistor, a twelfth resistor, a thirteenth resistor, and a seventh capacitor;
- wherein a first end of the first switch transistor and a first end of the second switch transistor are connected together to a cathode of the first diode, a second end of the first switch transistor and a control end of the second switch transistor are commonly connected to a positive output end of the inside-sound pick-up circuit, and a control end of the first switch transistor and a second end of the second switch transistor are commonly connected to a positive output end of the outside-sound pick-up circuit;
- wherein a first end of the third switch transistor and a first end of the fourth switch transistor are commonly connected to a cathode of the second diode, a second end of the third switch transistor and a control end of the fourth switch transistor are commonly connected to the positive output end of the inside-sound pick-up circuit, and a control end of the third switch transistor and a second end of the fourth switch transistor are commonly connected to the positive output end of the outside-sound pick-up circuit;
- wherein a first end of the fifth switch transistor and a first end of the sixth switch transistor are commonly connected to a cathode of the third diode, a second end of the fifth switch transistor and a control end of the sixth switch transistor are commonly connected to the positive output end of the inside-sound pick-up circuit, and a control end of the fifth switch transistor and a second end of the sixth switch transistor are commonly connected to the positive output end of the outside-sound pick-up circuit; and
- wherein the anode of the first diode, the anode of the second diode, and the anode of the third diode are commonly connected to a first end of the tenth resistor, a second of the tenth resistor, a first end of the eleventh resistor, and a control end of the seventh switch transistor are commonly connected, a first end of the seventh switch transistor and a second end of the eleventh resistor are commonly connected to a second power supply end, a second end of the seventh switch transistor is connected to a first end of the twelfth resistor, a second end of the twelfth resistor and a first end of the thirteenth resistor are commonly connected to an anode of the fourth diode, a second end of the thirteenth resistor is grounded, a cathode of the fourth diode is connected to a first end of the seventh capacitor, and a second end of the seventh capacitor is a output end of the signal operation circuit.

19. An electronic device, comprising the touch monitoring circuit according to claim 1.

20. An electronic device, comprising the touch display apparatus according to claim 10.

* * * * *